United States Patent
Costello et al.

(10) Patent No.: US 12,227,721 B2
(45) Date of Patent: Feb. 18, 2025

(54) HYDROFLUOROTHIOETHERS AND METHODS OF USING SAME

(71) Applicant: 3M INNOVATIVE PROPERTIES COMPANY, St. Paul, MN (US)

(72) Inventors: Michael G. Costello, Afton, MN (US); Zai-Ming Qiu, Woodbury, MN (US); David J. Lundberg, Cottage Grove, MN (US); Alexandre R. Monteil, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 683 days.

(21) Appl. No.: 17/608,918

(22) PCT Filed: May 6, 2020

(86) PCT No.: PCT/IB2020/054296
§ 371 (c)(1),
(2) Date: Nov. 4, 2021

(87) PCT Pub. No.: WO2020/229953
PCT Pub. Date: Nov. 19, 2020

(65) Prior Publication Data
US 2022/0298454 A1    Sep. 22, 2022

(51) Int. Cl.
| | | |
|---|---|---|
| C11D 1/72 | (2006.01) | |
| C11D 1/00 | (2006.01) | |
| C11D 1/722 | (2006.01) | |
| C11D 3/18 | (2006.01) | |
| C11D 3/20 | (2006.01) | |
| C11D 3/24 | (2006.01) | |
| C11D 3/34 | (2006.01) | |
| C11D 3/43 | (2006.01) | |
| C11D 3/44 | (2006.01) | |
| C11D 7/24 | (2006.01) | |

(52) U.S. Cl.
CPC ............ *C11D 3/245* (2013.01); *C11D 1/00* (2013.01); *C11D 1/72* (2013.01); *C11D 1/722* (2013.01); *C11D 3/18* (2013.01); *C11D 3/2068* (2013.01); *C11D 3/3427* (2013.01); *C11D 3/43* (2013.01); *C11D 7/24* (2013.01)

(58) Field of Classification Search
CPC .. C11D 1/00; C11D 1/72; C11D 1/722; C11D 3/18; C11D 3/2068; C11D 3/245; C11D 7/24; C11D 7/28
USPC ............... 510/245, 256, 421, 492, 505, 506
See application file for complete search history.

(56) References Cited

U.S. PATENT DOCUMENTS

| | | | |
|---|---|---|---|
| 3,476,812 A | 11/1969 | Terrell | |
| 3,816,277 A | 6/1974 | Haszeldine et al. | |
| 2004/0121927 A1* | 6/2004 | McDonald | C11D 7/26 510/245 |
| 2012/0149626 A1* | 6/2012 | Fluck | C11D 3/43 510/109 |
| 2013/0210695 A1* | 8/2013 | Bjelopavlic | C11D 1/66 510/501 |
| 2014/0102486 A1* | 4/2014 | Doyel | C11D 7/3218 510/109 |

FOREIGN PATENT DOCUMENTS

| | | | |
|---|---|---|---|
| JP | 2012087092 A | 5/2012 | |
| WO | 9622356 | 7/1996 | |
| WO | WO-0068351 A1 * | 11/2000 | ......... C11D 11/0029 |
| WO | 2008006866 | 1/2008 | |
| WO | 2013112682 | 8/2013 | |

OTHER PUBLICATIONS

Anello, "A convenient synthesis of hexafluoroacetone", J. Org. Chem., 1982, vol. 47, No. 2, pp. 377-378.
Babler, "A facile biomimetic method for ixidative deamination of primary amines to aldehydes via transportation of an imine functionality", J. Org. Chem., 1981, vol. 46, No. 9, pp. 1937-1938.
Dyatkin, "Reactions of perfluroalkylcarbonions with sulphur", Elsevier Science Publishers, 1973, vol. 29, pp. 2759-2767.
Ellis, "Cleaning and flux removal using organic solvents" Electrochemical Publications, 1986, pp. 182-194.
Haley, "Perfluoroalkyl derivatives of sulphur. Part XVIII. Reactions of polyfluoroidoalkanes with sodium methanethiolate in the presence of dimethyl disulphide and related reactions", JCS Perkin, 1976, No. 5, pp. 524-532.
Haszeldine, "Perfluoroalkyl derivatives of sulphur. Part XI. The recation of polyfluoromonoiodoalkanes with dimethyl disulphide", JCS Perkin, 1972, pp. 159-161.
Haszeldine, "Perfluoroalkyl of sulphur. Part X. The reaction of polyfluoromonoiodoalkanes with dimethyl sulphide to give methyl polyfluoralkyl sulphides", 1972, pp. 155-159.
Haszeldine, "Synthesis of methyl polyfluoroalkyl sulphodes and polyfluoroalkane-sulphonic acids", JCS Chem Comm, 1972, pp. 249-250.
International Search report for PCT International Application No. PCT/IB2020/054296 mailed on Jul. 8, 2020, 6 pages.
Terrell, "Synthesis of halogenated Dialkyl Sulfides", Journal of Organic Chemistry, 1965, vol. 30, No. 12, pp. 4011-4013.
Tordeux, "Reactions of bromotrifluoromethane and related halides Part VII[1] condensations with thiocyanates and isocyantes in the presence of zinc", Journal of Fluorine chemistry, 1989, vol. 43, No. 1, pp. 27-34.

\* cited by examiner

*Primary Examiner* — Gregory R Delcotto
(74) *Attorney, Agent, or Firm* — Jeffrey M. Olofson

(57) ABSTRACT

A composition includes a compound having structural formula (I): Rf—S—Rh (I) wherein (i) Rf is a partially fluorinated or perfluorinated group having 2 to 6 carbon atoms and optionally comprises one or more catenated heteroatoms, and (ii) Rh is a non-fluorinated hydrocarbon group having 1-3 carbon atoms and optionally comprises one or more catenated heteroatoms. The composition further includes an organic lubricant contaminant.

15 Claims, No Drawings

HYDROFLUOROTHIOETHERS AND METHODS OF USING SAME

CROSS REFERENCE TO RELATED APPLICATIONS

This application is a national stage filing under 35 U.S.C. 371 of PCT/IB2020/054296, filed May 6, 2020, which claims the benefit of U.S. Provisional Application No. 62/846,187, filed May 10, 2019, the disclosure of which is incorporated by reference in its/their entirety herein.

FIELD

The present disclosure relates to hydrofluorothioethers and methods of making and using the same, and to working or cleaning fluids that include the same.

BACKGROUND

Various compounds are described in, for example, U.S. Pat. No. 3,816,277.

SUMMARY

In some embodiments, a composition is provided. The composition includes a compound having structural formula (I):

$$Rf—S—Rh \qquad (I)$$

wherein (i) Rf is a partially fluorinated or perfluorinated group having 2 to 6 carbon atoms and optionally comprises one or more catenated heteroatoms, and (ii) Rh is a non-fluorinated hydrocarbon group having 1-3 carbon atoms and optionally comprises one or more catenated heteroatoms. The composition further includes an organic lubricant contaminant.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

DETAILED DESCRIPTION

The ever-increasing demand for reliability, continuing miniaturization, and the growing number of faults in electronic components manufactured without a cleaning process all combine to put increased focus on the use of cleaning solvents in electronics manufacturing. Cleaning fluids are specially engineered to dependably dissolve and remove common manufacturing greases and oils (e.g., long chain hydrocarbons having the formula $C_nH_{2n+2}$) used in the production of such industrial and consumer electronics products. Fluorinated cleaning fluids exhibiting high levels of hydrocarbon solubility are suitable for such applications due, in part, to their unique characteristics of low flammability, high density, low viscosity, low surface tension/high surface wettability, and higher vapor pressure resulting in quick evaporation from components after use. Furthermore, in sharp contrast to hydrocarbon solvents, fluorinated cleaning solvents minimize the amount of residue left on components after cleaning.

Currently, fluids used for dissolving and removing such greases and oils (e.g., long chain hydrocarbon alkanes), or other organics from surfaces contain fluid blends that include, for example, trans-1,2-dichloroethylene, 1,1,1-trichloroethane (TCA), trichloroethylene, and dichloromethane. Regarding such fluid blends, one drawback to this approach is the tendency for a change in the composition ratio over the lifetime of the cleaning fluid. This change in composition ratio, in turn, leads to safety concerns and compromises the performance of the cleaning fluid. Therefore, a single composition cleaning fluid which is nontoxic, nonflammable, and high in hydrocarbon solubility would be of significant benefit to the electronics cleaning industry. Moreover, some of the materials currently employed are regulated by the Montreal Protocol as ozone depleting substances or have toxicity concerns.

Recently, certain chlorine containing fluorocompounds have been discussed for use as cleaning fluids. Such molecules, while exhibiting desirable GWP profiles, have ozone depletion potentials (ODPs) that may be unacceptably high.

In view of an increasing demand for chemical compounds that are environmentally friendly (e.g., low GWP and low ODP) and low in toxicity, in addition to having strong cleaning ability, there exists a need for new long chain hydrocarbon alkanes cleaning fluids that possess such attributes. Additionally, it is desirable that such cleaning fluids are capable of being manufactured using cost-effective methods.

Generally, the present disclosure provides a new class of compounds useful as cleaning fluids (or as components of cleaning fluids). The compounds are hydrofluorothioethers (HFTEs), which provide better cleaning and physical properties than many current cleaning fluids, as well as provide lower atmospheric lifetimes, lower global warming potentials, lower ozone depleting potentials, and lower toxicities to provide a more acceptable environmental profile. Furthermore, the HFTEs of the present disclosure can be manufactured cost-effectively.

As used herein, "catenated heteroatom" means an atom other than carbon (for example, oxygen, nitrogen, or sulfur) that is bonded to at least two carbon atoms in a carbon chain (linear or branched or within a ring) so as to form a carbon-heteroatom-carbon linkage.

As used herein, "halogenated" (for example, in reference to a compound or molecule, such as in the case of "halogenated HFO") means that there is at least one carbon-bonded halogen atom.

As used herein, "fluoro-" (for example, in reference to a group or moiety, such as in the case of "fluoroalkylene" or "fluoroalkyl" or "fluorocarbon") or "fluorinated" means (i) partially fluorinated such that there is at least one carbon-bonded hydrogen atom, or (ii) perfluorinated.

As used herein, "perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine.

As used herein, "organic lubricant" means a mineral oil (e.g., a room temperature liquid, long chain alkane having the formula $C_nH_{2n+2}$), a semisolid grease (e.g., a room temperature semisolid, long chain alkanes having the formula $C_nH_{2n+2}$) a room temperature solid, but low melting point wax having the formula $C_nH_{2n+2}$, or a lipid.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure is directed to a hydrofluorothioether represented by the following structural formula (I):

Rf—S—Rh        (I)

In some embodiments, Rf is a partially fluorinated or perfluorinated group having 2 to 9, 2 to 6, or 2 to 4 carbon atoms that is saturated or unsaturated, linear or branched, acyclic or cyclic, and optionally includes one or more catenated heteroatoms, chlorine atoms, or bromine atoms. In some embodiments, Rf is partially fluorinated. In some embodiments, Rf has no more than two hydrogen atoms. In some embodiments, Rf is perfluorinated. In some embodiments, Rf is saturated.

In some embodiments, Rh is a non-fluorinated hydrocarbon group having 1-3 or 1-2 carbon atoms that is saturated or unsaturated, linear or branched, and optionally includes one or more catenated heteroatoms. In some embodiments, Rh is $CH_3$ or $CH_3CH_2$. In some embodiments, Rh is $CH_3$.

In some embodiments, any of the above discussed catenated heteroatoms may be secondary O heteroatoms wherein the O is bonded to two carbon atoms. In some embodiments, any of the above discussed catenated heteroatoms may be tertiary N heteroatoms wherein the N is bonded to three perfluorinated carbon atoms.

In some embodiments, the hydrofluorothioethers of the present disclosure may possess excellent hydrocarbon solubility, rendering them highly beneficial for use as cleaning fluids. In this regard, in some embodiments, the above-described hydrofluorothioethers may have a hydrocarbon solubility that is better than the compounds currently employed in hydrocarbon cleaning applications (e.g., hydrofluorooether containing compositions).

In some embodiments, the fluorine content in the hydrofluorothioether compounds of the present disclosure may be sufficient to make the compounds non-flammable according to ASTM D-3278-96 e-1 test method ("Flash Point of Liquids by Small Scale Closed Cup Apparatus").

In various embodiments, representative examples of the compounds of general formula (I) include the following:

$CF_3CF_2$—S—$CH_3$, $HCF_2CF_2$—S—$CH_3$, $HCFClCF_2$—S—$CH_3$, $CF_2ClCF_2$—S—$CH_3$, $CF_3CFCl$—S—$CH_3$, $CF_3CF_2CF_2$—S—$CH_3$, $CF_3OCF_2CF_2$—S—$CH_3$, $CF_3CHFCF_2$—S—$CH_3$, $(CF_3)_2CF$—S—$CH_3$, $CF_3CHFCF_2$—S—$CH_3$, $CF_3CF_2CF_2CF_2$—S—$CH_3$, $(CF_3)_2CFCF_2$—S—$CH_3$, $CF_3CF(CF_3)CF_2$—S—$CH_3$, $CF_3CF_2CF(CF_3)$—S—$CH_3$, $CF_3OCF_2CF_2CF_2$—S—$CH_3$, $CF_3CF_2CF_2CF_2$—S—$CH_2CH_3$, $CF_3CF_2CF(CF_3)$—S—$CH_2CH_3$, $CF_3CF_2CF_2CF_2$—S—$CH_2CH_3$, $(CF_3)_2NCF_2$—S—$CH_3$,

In some embodiments, the hydrofluorothioethers of the present disclosure may be useful over a broad operating temperature range. In this regard, in some embodiments, the hydrofluoroolefins of the present disclosure may have a boiling point of no lower than 20, 30, 40 or 50 degrees Celsius and no higher than 250, 150, 130, 120, 110, 100, 90, or 80 degrees Celsius.

In some embodiments, the hydrofluorothioethers of the present disclosure may be hydrophobic, relatively chemically unreactive, and thermally stable. The hydrofluorothioethers compounds may have a low environmental impact. In this regard, the hydrofluorothioethers compounds of the present disclosure may have a global warming potential (GWP) of less than 500, 300, 200, 100, 10 or less than 1. As used herein, GWP is a relative measure of the global warming potential of a compound based on the structure of the compound. The GWP of a compound, as defined by the Intergovernmental Panel on Climate Change (IPCC) in 1990 and updated in 2007, is calculated as the warming due to the release of 1 kilogram of a compound relative to the warming due to the release of 1 kilogram of $CO_2$ over a specified integration time horizon (ITH).

$$GWP_i(t') = \frac{\int_0^{ITH} a_i[C(t)]dt}{\int_0^{ITH} a_{CO_2}[C_{CO_2}(t)]dt} = \frac{\int_0^{ITH} a_i C_{oi} e^{-t/\tau_i} dt}{\int_0^{ITH} a_{CO_2}[C_{CO_2}(t)]dt}$$

In this equation $a_i$ is the radiative forcing per unit mass increase of a compound in the atmosphere (the change in the flux of radiation through the atmosphere due to the IR absorbance of that compound), C is the atmospheric concentration of a compound, τ is the atmospheric lifetime of a compound, t is time, and i is the compound of interest. The commonly accepted ITH is 100 years representing a compromise between short-term effects (20 years) and longer-term effects (500 years or longer). The concentration of an organic compound, i, in the atmosphere is assumed to follow pseudo first order kinetics (i.e., exponential decay). The concentration of $CO_2$ over that same time interval incorporates a more complex model for the exchange and removal of $CO_2$ from the atmosphere (the Bern carbon cycle model).

In some embodiments, the hydrofluorothioethers of the present disclosure may have an ozone depletion potential (ODP) of zero or near zero.

In some embodiments, the hydrofluorothioethers of the present disclosure may be synthesized in a one-step process by the reaction of i) perfluoroalkyl iodide with dialkyl sulfide or dialkyl disulfide and alkali metal alkanethiolate under UV or thermal conditions as disclosed in U.S. Pat. No. 3,816,277; or ii) perfluoroalkyl anion generated from perfluoroalkenes and a metal fluoride (MF) or Rf—I or Rf—Br with Rh—SCN as disclosed in J. Org. Chem., 46 (9), 1938, 1981; In some embodiments, the hydrofluorothioethers of the present disclosure may be synthesized in a two-step process by the reaction of a perfluorinated olefin with sulfur in the catalytic amount of MF to form a cyclic dithietane (e.g. as disclosed in J. Org. Chem., 47 (2), 377, 1982), followed by alkylation with a suitable alkylating reagent (e.g. as disclosed in *Izveshya Akademii Nauk SSSR, Seriya Khimicheskaya* 1989, 6, 1380-3).

In some embodiments, the present disclosure is further directed to working fluids that include the above-described hydrofluorothioether compounds as a major component. For example, the working fluids may include at least 25%, at least 50%, at least 70%, at least 80%, at least 90%, at least 95%, or at least 99% by weight of the above-described hydrofluorothioether compounds, based on the total weight of the working fluid. In addition to the hydrofluorothioether compounds, the working fluids may include a total of up to 75%, up to 50%, up to 30%, up to 20%, up to 10%, or up to 5% by weight of one or more of the following components: such as selected from, but not limited to alcohols, ethers, alkanes, alkenes, haloalkenes, perfluorocarbons, perfluorinated tertiary amines, perfluoroethers, cycloalkanes, esters, ketones, oxiranes, aromatics, siloxanes, hydrochlorocarbons, hydrochlorofluorocarbons, hydrofluorocarbons, hydrochloroolefins, hydrochlorofluoroolefins, hydrofluoroethers, sulfoxide, sulfones, perfluorosulfones or mixtures thereof, based on the total weight of the working fluid. In some embodiments, the working fluids comprising the hydrofluorothioether compounds and additional components may form an azeotrope. Such additional components can be chosen to modify or enhance the properties of a composition for a particular use.

In some embodiments, the cleaning compositions of the present disclosure may include one or more co-solvents. In some embodiments, the hydrofluorothioether compounds may be present in the cleaning compositions in an amount of greater than 25 weight percent, greater than 50 weight percent, greater than 60 weight percent, greater than 70 weight percent, greater than 80 weight percent, greater than 90 weight percent, or greater than 95 weight percent, based upon the total weight of the hydrofluorothioether compounds and the co-solvent(s).

In illustrative embodiments, the co-solvent may include alcohols, ethers, alkanes, alkenes, haloalkenes, perfluorocarbons, perfluorinated tertiary amines, perfluoroethers, cycloalkanes, esters, ketones, oxiranes, aromatics, haloaromatics, siloxanes, hydrochlorocarbons, hydrochlorofluorocarbons, hydrofluorocarbons, hydrofluoroolefins, hydrochloroolefins, hydrochlorofluoroolefins, hydrofluoroethers, or mixtures thereof. Representative examples of co-solvents which can be used in the cleaning compositions may include methanol, ethanol, isopropanol, t-butyl alcohol, methyl t-butyl ether, methyl t-amyl ether, 1,2-dimethoxyethane, cyclohexane, 2,2,4-trimethylpentane, n-decane, terpenes (e.g., a-pinene, camphene, and limonene), trans-1,2-dichloroethylene, cis-1,2-dichloroethylene, methylcyclopentane, decalin, methyl decanoate, t-butyl acetate, ethyl acetate, diethyl phthalate, 2-butanone, methyl isobutyl ketone, naphthalene, toluene, p-chlorobenzotrifluoride, trifluorotoluene, bis(trifluoromethyl)benzenes, hexamethyl disiloxane, octamethyl trisiloxane, perfluorohexane, perfluoroheptane, perfluorooctane, perfluorotributylamine, perfluoro-N-methyl morpholine, perfluoro-2-butyl oxacyclopentane, methylene chloride, chlorocyclohexane, 1-chlorobutane, 1,1-dichloro-1-fluoroethane, 1,1,1-trifluoro-2,2-dichloroethane, 1,1,1,2,2-pentafluoro-3,3-dichloropropane, 1,1,2,2,3-pentafluoro-1,3-dichloropropane, 2,3-dihydroperfluoropentane, 1,1,1,2,2,4-hexafluorobutane, 1-trifluoromethyl-1,2,2-trifluorocyclobutane, 3-methyl-1,1,2,2-tetrafluorocyclobutane, 1-hydropentadecafluoroheptane, or mixtures thereof. For example, such co-solvents can be chosen to modify or enhance the solvency properties of a cleaning composition for a particular use and can be utilized in ratios (of co-solvent to hydrofluorothioether compounds) such that the resulting composition has no flash point. In various embodiments, the cleaning compositions may include one or more surfactants. Suitable surfactants include those surfactants that are sufficiently soluble in the hydrofluorothioether, and which promote contaminant removal by dissolving, dispersing, or displacing the contaminant. One useful class of surfactants are those nonionic surfactants that have a hydrophilic-lipophilic balance (HLB) value of less than about 14. Examples include ethoxylated alcohols, ethoxylatedalkyl phenols, ethoxylated fatty acids, alkylarysulfonates, glycerol esters, ethoxylated fluoroalcohols, and fluorinated sulfonamides. Mixtures of surfactants having complementary properties may be used in which one surfactant is added to the cleaning composition to promote oily contaminant removal and another added to promote water-soluble contaminant removal. The surfactant, if used, can be added in an amount sufficient to promote contaminant removal. Typically, surfactant is added in amounts from 0.1 to 5.0 wt. %, or amounts from about 0.2 to 2.0 wt. %, based on the total weight of the surfactant(s) and the hydrofluorothioether compounds.

In some embodiments, if desirable for a particular application, the cleaning compositions can further include one or more dissolved or dispersed gaseous, liquid, or solid additives (for example, carbon dioxide gas, stabilizers, antioxidants, or activated carbon).

In some embodiments, the present disclosure is further directed to the above-described cleaning compositions, in their post-clean state. In this regard, the present disclosure is directed to any of the above-described cleaning compositions that include one or more contaminants dissolved, dispersed, or otherwise contained therein. For example, the compositions may include one or more hydrofluorothioethers and one or more contaminants dissolved in the hydrofluorothioethers to form a homogeneous composition.

In some embodiments, the present disclosure relates to cleaning compositions that include one or more hydrofluorothioether compounds of the present disclosure. In use, the cleaning compositions may serve to remove (e.g., dissolve) contaminants from the surface of a substrate. In this regard, the present disclosure is further directed to compositions that include the hydrofluorothioether compounds of the present disclosure and one or more contaminants (which have, for example, been removed from a substrate by the hydrofluorothioether compounds) which are dissolved or dispersed in the composition. Such compositions may be homogeneous, single phase compositions. In such compositions, the hydrofluorothioether compounds of the present disclosure may be present in an amount of at least 25 wt. %, at least 50 wt. %, at least 75 wt. %, at least 95 wt. %, or at least 99 wt. %, based on the total weight of the composition. In some embodiments, the contaminants may include light hydrocarbon contaminants; higher molecular weight hydrocarbon contaminants such as mineral oils, waxes, and greases; solder fluxes; particulates; water; or other contaminants encountered in precision, electronic, metal, and medical device cleaning. In some embodiments, the contaminants may include (e.g., at least 50% by weight) or consist essentially of organic lubricants. In some embodiments, the organic lubricants may include (e.g., at least 50% by weight) or consist essentially of one or more hydrocarbon alkanes having the formula $C_nH_{2n+2}$, where n is greater than 5, 9, 10, 12, 15, or 20.

In some embodiments, the contaminants may be present in the post-clean cleaning composition (individually or collectively) in an amount of between 0.0001% and 0.1 wt. %, between 0.1 and 10 wt. %, or between 10 and 20 wt. %; or at least 5 wt. %, at least 10 wt. %, at least 20 wt. %, based on the total weight of hydrofluorothioethers and contaminants in the post-clean composition.

In some embodiments, the cleaning compositions of the present disclosure can be used in either the gaseous or the liquid state (or both), and any of known or future techniques for "contacting" a substrate can be utilized. For example, a liquid cleaning composition can be sprayed or brushed onto the substrate, a gaseous cleaning composition can be blown across the substrate, or the substrate can be immersed in either a gaseous or a liquid composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182-94 (1986), which is herein incorporated by reference in its entirety.

Both organic and inorganic substrates can be cleaned by the processes of the present disclosure. Representative examples of the substrates include metals; ceramics; glass; polycarbonate; polystyrene; acrylonitrile-butadiene-styrene copolymer; natural fibers (and fabrics derived therefrom) such as cotton, silk, fur, suede, leather, linen, and wool; synthetic fibers (and fabrics) such as polyester, rayon, acrylics, nylon, or blends thereof; fabrics comprising a blend of natural and synthetic fibers; and composites of the foregoing materials. In some embodiments, the process may be used in the precision cleaning of electronic components (e.g., circuit boards), optical or magnetic media, or medical devices.

In some embodiments, the present disclosure relates to a process for cleaning a substrate. The cleaning process can be carried out by contacting a contaminated substrate with a cleaning composition as discussed above.

EXAMPLES

Objects and advantages of this disclosure are further illustrated by the following illustrative examples. Unless otherwise noted, all parts, percentages, ratios, etc. in the examples and the rest of the specification are by weight, and all reagents used in the examples were obtained, or are available, from general chemical suppliers such as, for example, Sigma-Aldrich Corp., Saint Louis, MO, US or may be synthesized by conventional methods.

TABLE 1

Materials

| Material | Description | Source |
| --- | --- | --- |
| Comparative Example CE1 | NOVEC 7100, $C_4F_9OCH_3$ | 3M Company, St. Paul, MN, US |
| Comparative Example CE2 | NOVEC 7000, $C_3F_2OCH_3$ | 3M Company, St. Paul, MN, US |
| Comparative Example CE3 | ASAHIKLIN AK-225 Dichloropentafluoropropane | AGC, Tokyo, Japan |
| Comparative Example CE4 | NOVEC 71DE, blend of $C_4F_9OCH_3$ and trans-1,2-dichloroethylene | 3M Company, St. Paul, MN, US |
| Comparative Example CE5 | 4-Chloro-1,1,3,3,3-pentafluoro-butane, $CF_3CH_2CF_2CH_2Cl$ | SynQuest Lab |
| HFP | Hexafluoropropene | Oakwood Chemical, Estill, SC, US |
| Sulfur | Sulfur powder | Alfa Aesar, Haverhill, MA, US |
| KF | Potassium Fluoride | Sigma-Aldrich Corp., Saint Louis, MO, US |
| CsF | Cesium Fluoride | Sigma-Aldrich Corp., Saint Louis, MO, US |
| n-$C_4F_9$—I | Nonafluoro-n-butyl Iodide | Oakwood Chemical, Estill, SC, US |
| $CH_3SCN$ | Methyl Thiocyanate | TCI America, Portland, OR, US |
| Zn | Zinc powder (325 mesh) | Sigma-Aldrich Corp., Saint Louis, MO, US |
| Py | Pyridine | Alfa Aesar, Haverhill, MA, US |
| DMF | N,N-Dimethylformamide | Alfa Aesar, Haverhill, MA, US |
| C-9 hydrocarbon | $C_9H_{20}$, mp = −53.5° C. | Sigma-Aldrich Corp., Saint Louis, MO, US |
| C-10 hydrocarbon | $C_{10}H_{22}$, mp = −29.7° C. | Sigma-Aldrich Corp., Saint Louis, MO, US |

TABLE 1-continued

Materials

| Material | Description | Source |
| --- | --- | --- |
| C-11 hydrocarbon | $C_{11}H_{24}$, mp = −25° C. | Sigma-Aldrich Corp., Saint Louis, MO, US |
| C-12 hydrocarbon | $C_{12}H_{26}$, mp = −9.6° C. | Sigma-Aldrich Corp., Saint Louis, MO, US |
| C-13 hydrocarbon | $C_{13}H_{28}$, mp = −5.4° C. | Sigma-Aldrich Corp., Saint Louis, MO, US |
| C-14 hydrocarbon | $C_{14}H_{30}$, mp = 5.9° C. | Sigma-Aldrich Corp., Saint Louis, MO, US |
| C-15 hydrocarbon | $C_{15}H_{32}$, mp = 9.9° C. | Sigma-Aldrich Corp., Saint Louis, MO, US |
| C-16 hydrocarbon | $C_{16}H_{34}$, mp = 18.2° C. | Sigma-Aldrich Corp., Saint Louis, MO, US |
| C-17 hydrocarbon | $C_{17}H_{36}$, mp = 21° C. | Sigma-Aldrich Corp., Saint Louis, MO, US |
| C-18 hydrocarbon | $C_{18}H_{38}$, mp = 28-30° C. | Sigma-Aldrich Corp., Saint Louis, MO, US |
| C-19 hydrocarbon | $C_{19}H_{40}$, mp = 32-34° C. | Sigma-Aldrich Corp., Saint Louis, MO, US |
| C-20 hydrocarbon | $C_{20}H_{42}$, mp = 36.7° C. | Sigma-Aldrich Corp., Saint Louis, MO, US |
| C-21 hydrocarbon | $C_{21}H_{44}$, mp = 40.5° C. | Sigma-Aldrich Corp., Saint Louis, MO, US |
| C-22 hydrocarbon | $C_{22}H_{46}$, mp = 42° C. | Sigma-Aldrich Corp., Saint Louis, MO, US |
| C-23 hydrocarbon | $C_{23}H_{48}$, mp = 48-50° C. | Sigma-Aldrich Corp., Saint Louis, MO, US |

Test Methods

Largest Soluble Hydrocarbon (LSH): The LSH of each hydrofluorothioether and competitive example was determined by mixing the compound with hydrocarbons of varying molecular weight ($C_nH_{2n+2}$, where n=9 to 24) in a test material to hydrocarbon ratio of approximately 1:1 to 1:2 by weight at room temperature (23° C.) and at 50° C. The LSH value is reported as the value of n in the formula $C_nH_{2n+2}$ for the longest hydrocarbon which was compatible with the hydrofluorothioether or competitive examples without exhibiting haze to the naked eye. A larger value of n is interpreted herein to indicate a greater ability of the hydrofluorothioether to clean hydrocarbons.

Atmospheric Lifetime and Global Warming Potential (GWP): The atmospheric lifetime of each test material was determined from relative rate studies utilizing chloromethane ($CH_3Cl$) as a reference compound. The pseudo-first order reaction rates of the reference compound and the test compound with hydroxyl radicals (·OH) was determined in a laboratory chamber system. The atmospheric lifetime of the reference compound is documented in the literature. Based on this value and the pseudo-first order rates measured in the chamber experiments, the atmospheric lifetime for each specimen was calculated from the reaction rates for the test compound relative to the reference compounds and the reported lifetime of the reference compounds as shown below:

$$\tau_x = \tau_r \cdot \frac{k_r}{k_x}$$

where $\tau_x$ is the atmospheric lifetime of test material, $\tau_r$ is the atmospheric lifetime of the reference compound, and $k_x$ and $k_r$ are the rate constants for the reaction of hydroxyl radical with test material and the reference compound, respectively. The concentrations of gases in the test chamber were quantified by Fourier transform infrared spectroscopy (FTIR). The measured atmospheric lifetime value of each fluid was subsequently used for the GWP calculation.

GWP values were calculated using methods described in the Intergovernmental Panel on Climate Change (IPCC) Fifth Assessment Report (AR5).

A gas standard of the material to be assessed, having a known and documented concentration, was prepared and used to obtain quantitative FTIR spectra of this compound. Quantitative gas phase, single component FTIR library reference spectra were generated at two different concentration levels by diluting the sample standard with nitrogen using mass flow controllers. The flow rates were measured using certified BIOS DRYCAL flow meters (Mesa Labs, Butler, NJ, US) at the FTIR cell exhaust. The dilution procedure was also verified using a certified ethylene calibration gas cylinder. Using methods described in AR5, the FTIR data were used to calculate the radiative efficiency, which in turn was combined with the atmospheric lifetime to calculate the global warming potential (GWP) value.

Toxicity: The repeat dose inhalation toxicity in rats was determined by a five day repeated exposure of 3 male rats to 750 ppm of the test compound for 6 hours per day.

Sample Preparation

Example 1: $n\text{-}C_4F_9\text{—}S\text{—}CH_3$

Example 1 was prepared from $n\text{-}C_4F_9\text{—}I$, $CH_3SCN$, and zinc powder in pyridine according to the procedure described by M. Tordeux, C. Francese, & C. Walkselman in "Reactions of bromotrifluoromethane and related halides Part VII [1] Condensations with thiocyanates and isocyanates in the presence of zinc," *Journal of Fluorine Chemistry*; Vol. 43, Issue 1 (1989); pp. 27-34, except that $n\text{-}C_4F_9\text{—}I$ was used in place of $CF_3Br$ and reacted at room temperature. $n\text{-}C_4F_9\text{—}S\text{—}CH_3$ was isolated in 71% yield with a boiling point of 84° C. The product structure was confirmed by $^1$H NMR and $^{19}$F NMR.

Example 2: $(CF_3)_2CFSCH_3$

To a dry 600 mL Hastalloy Parr reactor was added sublimed sulfur (36 g, 1.1 mol), anhydrous spray dried potassium fluoride (15 g, 260 mmol) and anhydrous N,N-dimethylformamide (300 mL). The reactor was sealed and the contents were heated to 60° C. with stirring. Once the reactor stabilized at this temperature, hexafluoropropene (150 g, 1.0 mol) was added at a rate of 6 g/min, maintaining the temperature below 65° C. When addition was complete, the reaction was stirred for 1 h at 60° C. before being cooled to ambient temperature. The resulting slurry was transferred to a 2 L round bottom flask to accommodate the addition of remaining reagents. Potassium fluoride (116 g, 2.0 mol) was added in a single portion, followed by dimethyl sulfate (104 mL, 1.1 mol) which was added via an addition funnel at a rate to maintain an internal reaction temperature below 45° C. Once the addition was complete the resulting reaction was stirred for 12 hours at ambient temperature. The heterogeneous solution was then filtered to remove solids, then washed 3 times with an equal volume of water. The lower phase was collected, dried over magnesium sulfate and filtered. The crude material was collected as a pale yellow oil (117 g, 93% desired product by GC-fid). This material was purified by distillation at ambient pressure to give the perfluoroisopropyl methyl thioether (98 g, 45% yield, b.p. 65° C.

Results

Table 2 summarizes results of Largest Soluble Hydrocarbon (LSH) testing of Examples 1-3 and Comparative Examples CE1-CE5. Since the largest hydrocarbon used was C-23 ($C_{23}H_{48}$), an LSH of ">23" indicates that the material was miscible with $C_{23}H_{48}$ without exhibiting haze.

Unexpectedly, Examples 1 and 2, which each contain a —S— group, demonstrate significantly higher LSH values in comparison to CE1 and CE2, which contain —O—. Example 1, a single component fluid, had a higher LSH value than CE4, a commercially available cleaning blend. This is advantageous in applications where a one-component cleaning fluid is desirable. Furthermore, Examples 1 and 2 both had comparable or higher LSH value than CE3 and CE5, which contain chlorine.

The results presented in Table 2 indicate that the hydrofluorothioethers of the present invention are highly suitable for cleaning applications and perform as well as or better than traditional cleaning blends or chlorine-containing cleaning materials.

TABLE 2

Largest Soluble Hydrogen

| | | LSH (n in $C_nH_{2n+2}$) | |
|---|---|---|---|
| Example | Structure | 23° C. | 50° C. |
| 1 | n-$C_4F_9$—S—$CH_3$ | 18 | 21 |
| CE1 | n-$C_4F_9$—O—$CH_3$ | 9 | 9 |
| 2 | $(CF_3)_2CF$—S—$CH_3$ | 18 | >23 |
| CE2 | $CF_3(CF_2)_2$—O—$CH_3$ | 10 | 10 |
| CE3 | $CF_3CF_2CHCl_2$/ $CClF_2CF_2CHClF$ | 19 | >23 |

TABLE 2-continued

Largest Soluble Hydrogen

| | | LSH (n in $C_nH_{2n+2}$) | |
|---|---|---|---|
| Example | Structure | 23° C. | 50° C. |
| CE4 | $C_4F_9OCH_3$/ t-DCE Blend | 15 | 18* |
| CE5 | $CF_3CH_2CF_2CH_2Cl$ | 14 | 17 |

*Measured at 41° C., the boiling point of CE4.

The atmospheric lifetimes of Examples 2 and CE2 were determined from their rates of reaction with hydroxyl radicals as described above and are reported in Table 3.

TABLE 3

Atmospheric Lifetime

| Example | Atmospheric Lifetime, years | GWP, 100 yr |
|---|---|---|
| 2 | 0.01 | 0.027 |
| CE2 | 5.0 | 530 |

The repeat dose inhalation toxicity in rats was determined by a five day repeated exposure of 3 male rats to 750 ppm (6-hour/day) of Example 2. Testing demonstrated no adverse clinical signs of toxicity, changes in body weights, or organ weights (lungs, liver, and kidneys). No adverse histopathological effects were observed in the respiratory tract, liver, or kidneys.

Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows. All references cited in this disclosure are herein incorporated by reference in their entirety.

What is claimed is:

1. A composition comprising:
a compound having structural formula (I):

Rf—S—Rh     (I)

wherein (i) Rf is a perfluorinated group having 3 to 6 carbon atoms and optionally comprises one or more catenated heteroatoms, and (ii) Rh is a non-fluorinated hydrocarbon group having 1-3 carbon atoms and optionally comprises one or more catenated heteroatoms; and
an organic lubricant contaminant, wherein the organic lubricant comprises a hydrocarbon having the formula $C_nH_{2n+2}$, where n is greater than 5.

2. The composition of claim 1, wherein Rf is saturated.

3. The composition of claim 1, wherein Rh is $CH_3$ or $CH_3CH_2$.

4. The composition of claim 1, wherein the organic lubricant contaminant is dissolved in the composition.

5. The composition of claim 1, wherein the compound having structural formula (I) is present in the composition at an amount of at least 25% by weight based on the total weight of the composition.

6. The composition of claim 1, wherein the compound having structural formula (I) is present in the composition at an amount of at least 50% by weight based on the total weight of the composition.

7. The composition of claim 1, wherein the organic lubricant is present in the composition at an amount of between 0.0001% and 20% by weight, based on the total weight of the compounds of structural formula (I).

8. The composition of claim 1, wherein the composition further comprises a co-solvent.

9. The composition of claim 8, wherein said co-solvent comprises alcohols, ethers, alkanes, alkenes, haloalkenes, perfluorocarbons, perfluorinated tertiary amines, perfluoroethers, cycloalkanes, esters, ketones, sulfoxide, sulfone, oxiranes, aromatics, haloaromatics, siloxanes, hydrochlorocarbons, hydrochlorofluorocarbons, hydrofluorocarbons, hydrofluoroolefins, hydrochloroolefins, hydrochlorofluoroolefins, hydrofluoroethers, or mixtures thereof.

10. The composition of claim 1, wherein the composition further comprises a surfactant.

11. The composition of claim 10, wherein the composition comprises from 0.1 to 5 percent by weight of the surfactant, based on the total weights of the compound having structural formula (I) and the surfactant.

12. The composition of claim 10, wherein the surfactant comprises a nonionic surfactant comprising an ethoxylated alcohol, an ethoxylated alkylphenol, an ethoxylated fatty acid, a glycerolester, an ethoxylated fluoroalcohol, a fluorinated sulfonamide, or mixtures thereof.

13. A process for removing a contaminant from a substrate, the process comprising the steps of:

contacting the substrate with a compound having structural formula (I):

Rf—S—Rh            I wherein (i) Rf is a perfluorinated group having 3 to 6 carbon atoms and optionally comprises one or more catenated heteroatoms, and (ii) Rh is a non-fluorinated hydrocarbon group having 1-3 carbon atoms and optionally comprises one or more catenated heteroatoms, and removing a contaminant from the substrate, wherein the contaminant comprises and an organic lubricant, wherein the organic lubricant comprises a hydrocarbon having the formula $C_nH_{2n+2}$, where n is greater than 5.

14. The process of claim 13, wherein Rf is saturated.

15. The process of claim 13, wherein Rh is $CH_3$ or $CH_3CH_2$.

* * * * *